United States Patent [19]
Yang et al.

[11] 3,975,230

[45] Aug. 17, 1976

[54] STEAM DISTILLATION OF POLYVINYL CHLORINE SLURRY IN PRESENCE OF METAL SALT

[75] Inventors: Kang Yang; James D. Reedy, both of Ponca City, Okla.

[73] Assignee: Continental Oil Company, Ponca City, Okla.

[22] Filed: Mar. 24, 1975

[21] Appl. No.: 561,404

[52] U.S. Cl. .......................... 159/47 R; 159/16 S; 159/DIG. 10; 203/33; 203/39; 203/53; 203/96; 260/29.6 PT; 528/500; 526/344

[51] Int. Cl.² ...................... B01D 1/14; B01D 3/38; C08F 114/02

[58] Field of Search ............... 203/33, 39, 96, 53, 203/95, 97; 260/92.8 A, 87.1, 29.6 PT; 159/DIG. 10, 16 S, 47 R

[56] References Cited
UNITED STATES PATENTS

| | | | |
|---|---|---|---|
| 2,662,867 | 12/1953 | Hoertz | 260/29.6 PT |
| 3,052,663 | 9/1962 | Boedlander et al. | 260/92.8 A |
| 3,053,820 | 9/1962 | Weschler et al. | 260/87.1 |
| 3,414,547 | 12/1968 | Thompson et al. | 260/92.8 A |
| 3,440,148 | 4/1969 | Melancini et al. | 203/33 |

*Primary Examiner*—Wilbur L. Bascomb, Jr.
*Attorney, Agent, or Firm*—Bayless E. Rutherford, Jr.

[57] ABSTRACT

An improvement in the process for removing vinyl chloride from a water-polyvinyl chloride slurry, which contains unreacted vinyl chloride, by steam distillation is disclosed. In many instances, steam distillation of the slurry results in an increase in the number of gels or fish eyes. The improvement comprises conducting the steam distillation in the presence of a minor, but effective, amount of an alkali metal sulfite or carbonate. The improved process results in a polyvinyl chloride having no substantial increase in, or a reduced amount of, gels or fish eyes, while still having good heat stability and porosity properties.

11 Claims, No Drawings

STEAM DISTILLATION OF POLYVINYL CHLORINE SLURRY IN PRESENCE OF METAL SALT

BACKGROUND

One of the preferred methods for the commercial preparation of polyvinyl chloride consists in carrying out the polymerization of vinyl chloride in an aqueous suspension. The slurry obtained from the polymerization reactor generally has a polyvinyl chloride content in the range of 20 to 60% by weight. More usually, the polyvinyl chloride content is in the range of 30 to 50% by weight. The slurry also contains residual vinyl chloride, which is present in an amount of less than 0.1 to 5%. One means of removing the vinyl chloride is by steam distillation. While steam distillation removes a substantial amount of vinyl chloride, the polyvinyl chloride resulting from the process still has some gels or fish eyes, which are objectionable. Moreover, occasionally the steam distillation causes an increase in the gels or fish eyes.

The problem of gels or fish eyes in polyvinyl chloride is well known and understood in the art. However, in order to provide a better disclosure, a brief discussion is provided of this problem.

Polyvinyl chloride film and articles are prepared by fusing small particles of polyvinyl chloride in the presence of plasticizer. In the fusion process some particles of polyvinyl chloride absorb plasticizer at a rate different from the majority of the particles. As a result, the film or articles have imperfections such as deformations or surface roughness. The particles causing this problem are known as "gels" or "fish eyes."

My invention is directed to an improved process for removing vinyl chloride from a water-polyvinyl slurry by steam distillation wherein the polyvinyl chloride, after steam distillation, and on further processing, has no substantial increase in, or a reduced amount of, gels or fish eyes. Moreover, my process results in a product still having good heat stability and porosity properties.

PRIOR ART

A computer search was conducted on the subject of the present invention. The search resulted in four patents concerned with this general area. These patents are: U.S Pat. Nos. 3,982,760; 3,053,820; 3,371,059 and 3,512,570.

BRIEF SUMMARY OF THE INVENTION

Briefly stated, the present invention is directed to an improved process for removing vinyl chloride from a water-polyvinyl chloride slurry, containing unreacted vinyl chloride, by steam distillation, wherein the improvement comprises conducting said steam distillation in the presence of a minor, but effective, amount of an alkali metal sulfite or carbonate.

The improved process results in polyvinyl chloride which, upon further processing, has no substantial increase in, or reduced amount of, gels or fish eyes. Moreover, the polyvinyl chloride of my process still has good heat stability and porosity properties.

DETAILED DESCRIPTION

Based on present knowledge, my invention is limited to the alkali metal sulfites and carbonates. More suitably, the cation is sodium, potassium or lithium. Preferably, sodium sulfite or sodium carbonate is used in my invention. Of course, it is to be understood that mixtures of the materials can be used.

Knowing that a minor amount of the designated materials can be used in my invention, any person skilled in the art can readily determine the optimum amount. In order to provide a more specific teaching, a suitable amount is in the range of from about 0.001 to about 1% by weight, with a preferable amount being in the range of about 0.01 to about 0.5% by weight. These amounts are based on the total amount of water-polyvinyl chloride slurry subjected to the steam distillation.

It is of interest that the following materials are not satisfactory in the process of my invention either because they impair heat stability, deteriorate the gel count, or a combination of both: potassium chloride, potassium bromide, potassium iodide, sodium hypochlorite.

My invention is applicable to any slurry comprising water and polyvinyl chloride and which contains a minor amount of unreacted vinyl chloride. As indicated hereinbefore, my invention is particularly suitable for use with such slurries which are prepared by suspension polymerization of vinyl chloride. As indicated therein before, such slurries contain from about 20 to about 60% by weight, preferably from about 30 to about 50% by weight, polyvinyl chloride. Also, slurries will contain unreacted vinyl chloride in an amount of less than 0.1 to about 5%.

Steam distillation of water-polyvinyl chloride slurries, which contain unreacted vinyl chloride, to remove a major amount of the vinyl chloride, is well known in the art. Knowing this, any person skilled in the art can readily determine the optimum time for distillation. Typically, times in the range of 5 to 180 minutes can be used.

After completion of the steam distillation step, the slurry is allowed to cool to ambient temperature and the water is removed from the polyvinyl chloride by conventional means, for example, filtration. The polyvinyl chloride is then dried and processed in the conventional manner.

At the risk of being redundant, I wish to emphasize that my invention resides in the aspect of cnducting the steam distillation of the water-polyvinyl chloride slurry in the presence of the alkali metal sulfite or carbonate. All other steps are conventional in the art.

Again it should be stated that my invention produces a polyvinyl chloride product having a gel count which is no higher than a polyvinyl chloride product which is not subjected to steam distillation. In some instances, my invention results in a polyvinyl chloride product having a gel count which is less than a similar product which is not subjected to steam distillation.

In order to disclose the nature of the present invention still more clearly, the following illustrative examples will be given. It is to be understood that the invention is not to be limited to the specific conditions or details set forth in these examples except insofar as such limitations are specified in the appended claims.

The procedure for determining gel count was as follows:

In a 2-liter stainless steel beaker, mix the following formulation:

| | |
|---|---|
| Polyvinyl chloride | 100 Grams |
| Dioctyl phthalate | 50 Grams |
| Calcium Stearate | 2 Grams |

Mill batch on two roll differential speed mill at 325°F as follows:

Set mill opening to 0.030 inch. Band mixture on the slow speed roll for 2 minutes. Transfer batch to fast roll and add Claremont D-11 Non-Pinhole Black Paste — 1 Gram.

Maintain batch on fast roll for 2 minutes while working stock thoroughly by constant cutting and folding. At the end of 2 minutes, reduce mill opening to 0.010 inch. Let stock rotate on fast roll for 1 minute without further working, and sheet off. Mark off a 6-inch by 6-inch square section in center of sheet, and examine against day light or a distant artificial light source.

Count gels in the square differentiating between small and large gels.

The gel count measurement was a total of both large and small gels.

In all examples, the original water-polyvinyl chloride slurry contained 29 weight percent polyvinyl chloride and 4800 parts per million by weight of unreacted vinyl chloride.

EXAMPLE 1

This example shows that in many instances steam distillation results in an increase in gel count.

Six hundred grams of the water-polyvinyl chloride slurry was divided into equal parts. One part was retained as a control, which was filtered to remove most of the water. The polyvinyl chloride was then dried. The other part was boiled at 97°C for about 30 minutes to remove 10 grams of water as steam. The resulting sample was then filtered and dried in the same manner as the control run. The steam distilled sample contained 0.7 ppm vinyl chloride. The gel count was determined, using the described procedure, on both the control and the steam distilled sample. The results are shown as Run A in Table I.

Three additional runs were made using the above-described procedure. The results are shown as Runs B, C and D in Table I.

Table I

| | Effect Of Steam Stripping On Gel Count | |
|---|---|---|
| Run No. | Control | Stripped Sample |
| A | 9 | 3 |
| B | 0 | 9 |
| C | 1 | 8 |
| D | 8 | 11 |
| Average | 5±5* | 8±3 |

*Standard deviation based on n−1 degree of freedom.

EXAMPLE 2

This example illustrates the improvement obtained by adding sodium carbonate to the water-polyvinyl chloride slurry prior to heating to remove water as steam.

Four runs were made. The procedure was the same as in Example 1, with the exception that 0.1% (weight) of sodium carbonate was added to the slurry prior to steam distillation. (The control runs were not steam distilled.) The runs were designated E, F, G and H. The results are shown in Table II.

Table II

| | Effect of Sodium Carbonate On Gel Count | |
|---|---|---|
| Run No. | Control | Sodium Carbonate Added |
| E | 4 | 3 |
| F | 3 | 2 |
| G | 1 | 1 |
| H | 2 | 3 |
| Average | 3±1 | 2±1 |

EXAMPLE 3

This example illustrates the improvement obtained by adding sodium sulfite to the water-polyvinyl chloride slurry prior to heating to remove water as steam.

The amount of sodium sulfite was 0.1% (weight). The procedure was the same as in Example 2. The runs were designated I, J, K and L. The results are shown in Table III.

Table III

| | Effect of Sodium Sulfite on Gel Count | |
|---|---|---|
| Run No. | Control | Sodium Sulfite Added |
| I | 4 | 4 |
| J | 2 | 2 |
| K | 3 | 2 |
| L | 2 | 1 |
| Average | 3±1 | 2±1 |

A comparison of Tables II and III with Table I shows that sodium carbonate and sodium sulfite prevent an increase gel count due to the stripping operation. In some instances, a reduction in gel count is obtained.

Thus, having described the invention in detail, it will be understood by those skilled in the art that certain variations and modifications may be made without departing from the spirit and scope of the invention as defined herein and in the appended claims.

I claim:

1. An improved process for removing vinyl chloride from a water-polyvinyl chloride slurry, which contains unreacted vinyl chloride, by steam distillation, wherein the improvement comprises conducting said steam distillation in the presence of an effective amount of an alkali metal sulfite or carbonate.

2. The process of claim 1 wherein the amount of alkali metal sulfite or carbonate is from about 0.001 to about 1% by weight based on the water-polyvinyl chloride slurry.

3. The process of claim 2 wherein sodium sulfite is used.

4. The process of claim 2 wherein sodium carbonate is used.

5. The process of claim 2 wherein potassium sulfite is used.

6. The process of claim 2 wherein potassium carbonate is used.

7. The process of claim 1 wherein (a) the water-polyvinyl chloride slurry contains from about 20 to about 60 weight % polyvinyl chloride and from about 0.1 to about 5 weight % unreacted vinyl chloride and (b) the amount of alkali metal sulfite or carbonate is from about 0.001 to about 1% by weight based on the water-polyvinyl chloride slurry.

8. The process of claim 7 wherein sodium sulfite is used.

9. The process of claim 7 wherein sodium carbonate is used.

10. The process of claim 7 wherein potassium sulfite is used.

11. The process of claim 7 wherein potassium carbonate is used.

* * * * *